US010338456B2

(12) United States Patent
Daiku

(10) Patent No.: US 10,338,456 B2
(45) Date of Patent: Jul. 2, 2019

(54) DISPLAY APPARATUS WITH LIQUID CRYSTAL DISPLAY PROJECTING AN IMAGE ON A TRANSMISSIVE SCREEN

(71) Applicant: ORTUS TECHNOLOGY CO., LTD., Hino (JP)

(72) Inventor: Yasuhiro Daiku, Hino (JP)

(73) Assignee: ORTUS TECHNOLOGY CO., LTD., Hino (JP)

( * ) Notice: Subject to any disclaimer, the term of this patent is extended or adjusted under 35 U.S.C. 154(b) by 276 days.

(21) Appl. No.: 15/132,789

(22) Filed: Apr. 19, 2016

(65) Prior Publication Data

US 2016/0231644 A1    Aug. 11, 2016

Related U.S. Application Data

(63) Continuation of application No. PCT/JP2014/079798, filed on Nov. 11, 2014.

(30) Foreign Application Priority Data

Nov. 14, 2013  (JP) .................................. 2013-236314

(51) Int. Cl.
*G02B 13/06* (2006.01)
*G02B 27/00* (2006.01)
(Continued)

(52) U.S. Cl.
CPC ............. *G03B 21/16* (2013.01); *G02B 13/06* (2013.01); *G02B 27/0025* (2013.01);
(Continued)

(58) Field of Classification Search
CPC combination set(s) only.
See application file for complete search history.

(56) References Cited

U.S. PATENT DOCUMENTS

| 4,859,053 A * | 8/1989 | Nicolas ................... G09F 19/18 |
| | | 353/74 |
| 2005/0117077 A1* | 6/2005 | Utsunomiya ..... G02F 1/133385 |
| | | 349/5 |

(Continued)

FOREIGN PATENT DOCUMENTS

| JP | 11-64795 | 3/1999 |
| JP | 11-174404 | 7/1999 |

(Continued)

OTHER PUBLICATIONS

International Search Report dated Jan. 13, 2015, in corresponding International Application No. PCT/JP2014/079798.

(Continued)

*Primary Examiner* — Lauren Nguyen

(57) ABSTRACT

A display apparatus includes: a light source; a liquid crystal display element which transmits light from the light source; a screen which receives projection light from the liquid crystal display element; a first polarizing plate provided between the light source and the liquid crystal display element; a second polarizing plate provided between the liquid crystal display element and the screen; and a reflective polarizing plate which is provided between the light source and the first polarizing plate and which reflects a light component parallel to a reflection axis among the light from the light source.

13 Claims, 11 Drawing Sheets

(51) Int. Cl.
*G02B 27/26* (2006.01)
*G03B 21/00* (2006.01)
*G03B 21/10* (2006.01)
*G03B 21/16* (2006.01)
*G03B 21/62* (2014.01)
*G02F 1/1335* (2006.01)

(52) U.S. Cl.
CPC ....... *G02B 27/26* (2013.01); *G02F 1/133536* (2013.01); *G03B 21/006* (2013.01); *G03B 21/10* (2013.01); *G02F 2001/133531* (2013.01); *G03B 21/62* (2013.01)

(56) References Cited

U.S. PATENT DOCUMENTS

2008/0252801 A1* 10/2008 Furuta ............... G02F 1/133536
  349/9
2011/0273643 A1* 11/2011 Arai .................. G02F 1/133528
  349/64

FOREIGN PATENT DOCUMENTS

| JP | 2000-75258 | 3/2000 | | |
|----|-----------|--------|---|---|
| JP | 2005-164908 | 6/2005 | | |
| JP | 2007-86140 | 4/2007 | | |
| JP | 2008-268264 | 11/2008 | | |
| JP | 2009-229756 | 10/2009 | | |
| JP | 2012-078730 | * 4/2012 | ............... | G02F 1/13 |
| JP | 2012-78730 | 4/2012 | | |

OTHER PUBLICATIONS

International Preliminary Report on Patentability dated May 26, 2016 in corresponding International Patent Application No. PCT/JP2014/079798.

Japanese Office Action dated Jul. 4, 2017 in corresponding Japanese Patent Application No. 2013-236314.

* cited by examiner

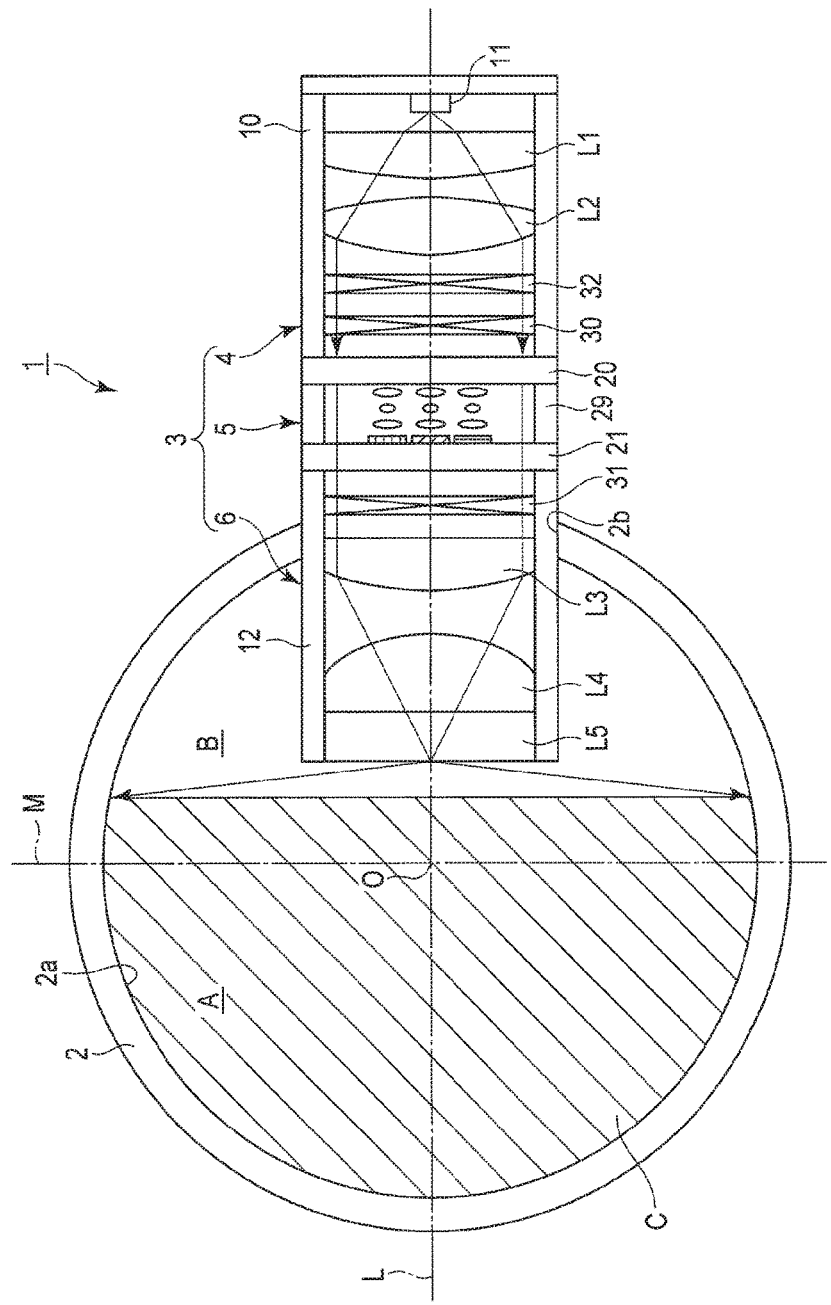
F I G. 7

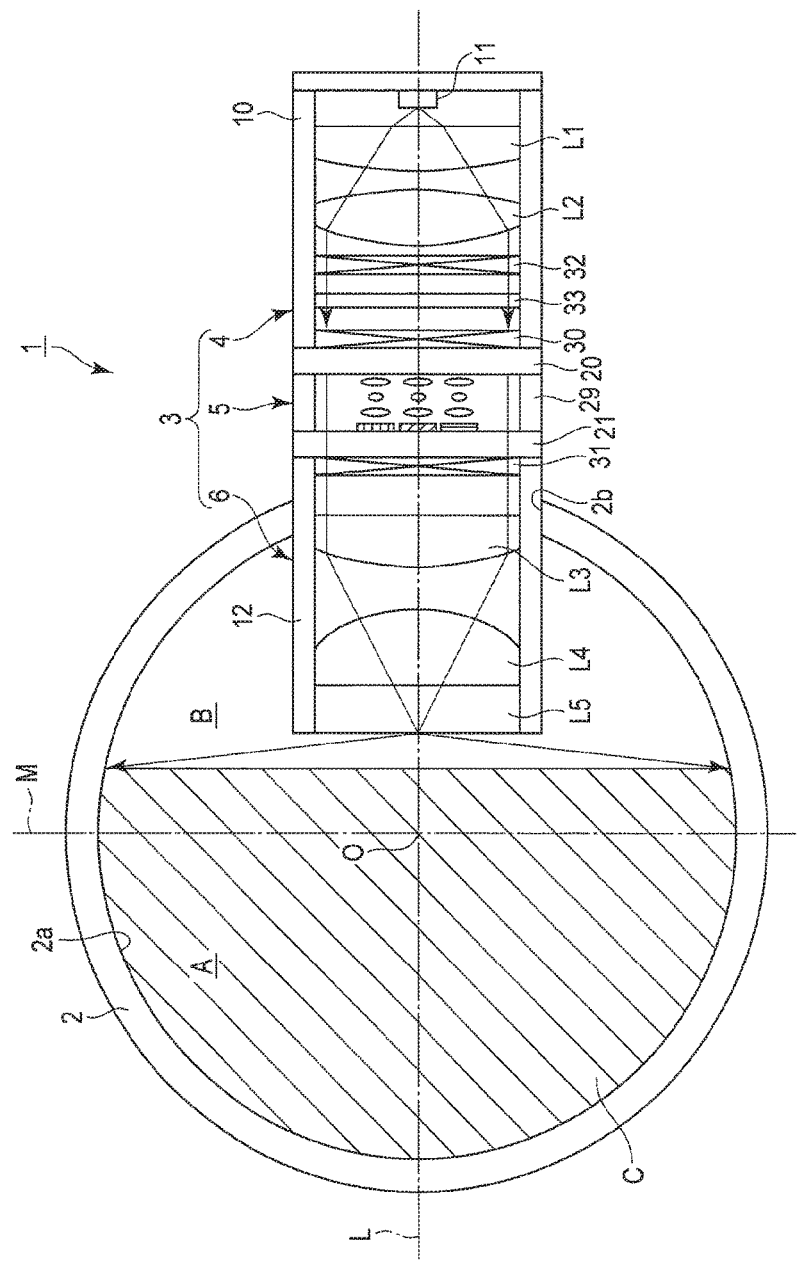
F I G. 11

DISPLAY APPARATUS WITH LIQUID CRYSTAL DISPLAY PROJECTING AN IMAGE ON A TRANSMISSIVE SCREEN

CROSS-REFERENCE TO RELATED APPLICATIONS

This application is a Continuation Application of PCT Application No. PCT/JP2014/079798, filed Nov. 11, 2014, and based upon and claiming the benefit of priority from Japanese Patent Application No. 2013-236314, filed Nov. 14, 2013, the entire contents of all of which are incorporated herein by reference.

BACKGROUND OF THE INVENTION

1. Field of the Invention

The present invention relates to a display apparatus, particularly to a display apparatus projecting an image on a transmissive screen, for example.

2. Description of the Related Art

A display apparatus in which light from a point light source is made incident to a liquid crystal display element via an optical system consisting of a plurality of lenses, and which projects projection light from the liquid crystal display element on a screen is known (for example, Jpn. Pat. Appln. KOKAI Publication No. 2012-78730). To display an image projected on a spherical screen more brightly, it is necessary to increase luminance of the light source. In this case, light from the light source generates heat in a liquid crystal display element. Particularly, light absorbed by a polarizing plate used in the liquid crystal display element generates heat in the liquid crystal display element. The heat deteriorates the characteristics of the liquid crystal layer, and the display characteristics of the liquid crystal display element.

BRIEF SUMMARY OF THE INVENTION

According to an aspect of the present invention, there is provided a display apparatus comprising:
a light source;
a liquid crystal display element which transmits light from the light source;
a screen which receives projection light from the liquid crystal display element;
a first polarizing plate provided between the light source and the liquid crystal display element;
a second polarizing plate provided between the liquid crystal display element and the screen; and
a reflective polarizing plate which is provided between the light source and the first polarizing plate and which reflects a light component parallel to a reflection axis among the light from the light source.

BRIEF DESCRIPTION OF THE SEVERAL VIEWS OF THE DRAWINGS

FIG. 7 is a diagram schematically showing a cross-sectional structure of the spherical projection display apparatus according to variation 2;

FIG. 11 is a diagram schematically showing a cross-sectional structure of the spherical projection display apparatus according to the second embodiment of the present invention;

DETAILED DESCRIPTION OF THE INVENTION

Figure 1:
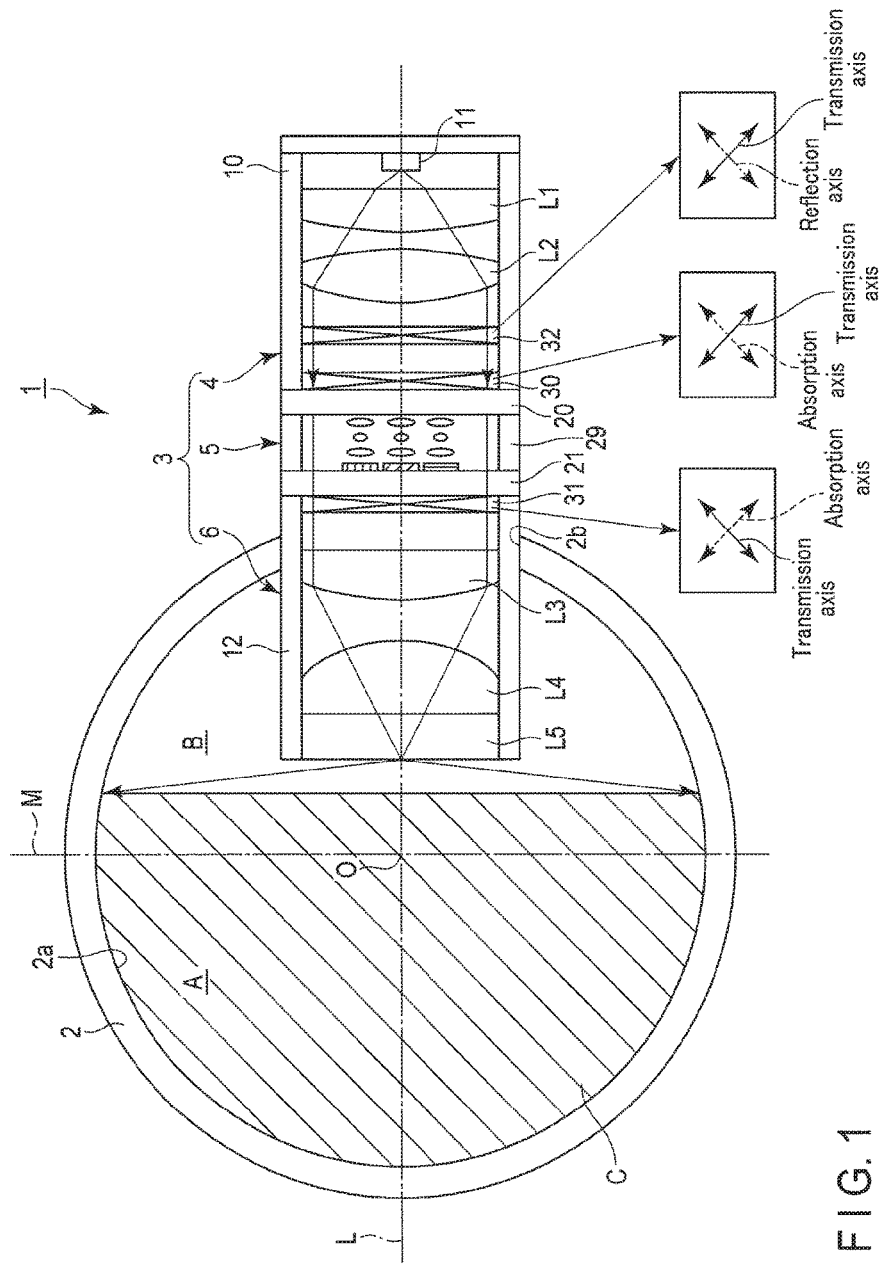
FIG. 1 is a diagram schematically showing a cross-sectional structure of the spherical projection display apparatus according to the first embodiment of the present invention.

The embodiments of the present invention will be described below with reference to the accompanying drawings. Note that the drawings are schematic and conceptual, and the dimensions, ratios, and the like in the respective drawings are not necessary the same as those in reality. In addition, even the same portion may be shown in a different dimensional relationship or with different ratios indifferent drawings. Several embodiments to be described below represent examples of apparatuses and methods for embodying the technical idea of the present invention, and the technical idea of the present invention is not specified by the shapes, structures, and layouts of the constituent parts. The technical idea of the present invention can be embodied by modifying constituent elements without departing from the gist of the invention. Note that in the following explanation, the same reference numerals denote elements having the same functions and arrangements, and a repetitive explanation will be made only when necessary.

In the following embodiments, a spherical projection display apparatus for displaying an image on a transmissive spherical screen will be described as an example of a display apparatus.

First Embodiment

FIG. 1 is a diagram schematically showing a cross-sectional structure of the spherical projection display apparatus 1 according to the third embodiment of the present invention. The spherical projection display apparatus 1 comprises a spherical screen 2 and a projector 3 fixed to the spherical screen 2.

The spherical screen 2 is a transmissive screen, and its inner surface 2a constituting a part of the spherical surface is used as a projection surface. The light diffusiveness of the spherical screen 2 is secured by applying a material for diffusing light on one or both of the inner and outer surfaces of a transmissive base material, for example, or by performing a light diffusing treatment on the surfaces. It should be noted that the spherical screen 2 may be formed of light-diffusing materials of one's choosing.

As shown in FIG. 1, an opening 2b is provided on the hollow sphere (on the right side of the sphere in FIG. 1). The spherical screen 2 is formed by making the opening 2b on one of the hemispherical members constituting a hollow sphere, joining the set of hemispherical members with a transparent adhesive, etc. to make the juncture as invisible as possible.

The projector 3 comprises a light source unit 4, a transmissive liquid crystal display element 5, and a projection unit 6. The light source unit 4 comprises a point light source 11 stored in a cylindrical case 10, a first lens L1, and a second lens L2 constituting the light source optical system and facing the point light source 11. The light source optical system including the first lens L1 and the second lens L2 makes light emitted from the point light source 11 incident on the liquid crystal display element 5 as parallel light or approximately parallel light.

A discretionary light source can be used as the point light source 11; however, an LED (Light Emitting Diode) with high luminance is preferable from the viewpoint of downsizing, power conservation, and durability of the spherical projection display apparatus 1. For example, using a high-luminance white LED or a high-luminance RGB-LED is preferable.

The liquid crystal display element 5 is driven in accordance with image data (RGB data, etc.) and displays an image represented by the image data. The liquid crystal display element 5 controls light entered from the second lens L2, thereby functioning as a light modulating element which converts the above image data into projection light. Although not shown in the drawings, the liquid crystal display element 5 is driven by a driving circuit provided integrally with or separately from the projector 3 based on image data externally supplied (from other electronic devices).

The projection unit 6 is internally fitted into the opening 2b provided in the spherical screen 2, and it comprises a cylindrical case 12 of which one end is located in the vicinity of the center O (the center of the sphere including the inner surface 2a), a third lens L3, a fourth lens L4, and a fifth lens L5, included in the case 12 and located on an optical axis of the liquid crystal display element 5.

The projection optical system consists of the third lens L3 through the fifth lens L5. The projection optical system emits light which transmits the liquid crystal display element 5, in other words, projection light which is obtained by converting image data, from the vicinity of the center O of the spherical screen 2, and projects an image represented by the image data on the inner surface 2a of the spherical screen 2. For the projection optical system consisting of the third lens L3 through the fifth lens L5, a focal length is set shorter so that the aforementioned image is projected in a region beyond the hemisphere in the inner surface 2a of the spherical screen 2.

In other words, the optical axis L of each of the first lens L1 through the fifth lens L5 passes through the center O of the spherical screen 2. The inner surface 2a of the spherical screen 2 consists of a hemisphere region A on one side (the left side in FIG. 1), and a ring-shaped region B which is a part of the hemisphere on the other side (the right side in FIG. 1), and is continuous with the hemisphere region A when the sphere including the inner surface 2a is divided by the plane M perpendicular to the optical axis L of the projection light optical system. Therefore, the region C (the region indicated by shading in FIG. 1), extending from the above-mentioned hemisphere region A to the above-mentioned ring-shaped region B, is a projection region on which an image is projected on the inner surface 2a of the spherical screen 2.

By using, for example, a lens which will be described later as the third lens L3 to the fifth lens L5, a distortion correction function to optically compensate a distortion in an image projected on the inner surface 2a of the spherical screen is secured for the projection optical system.

Figure 2:
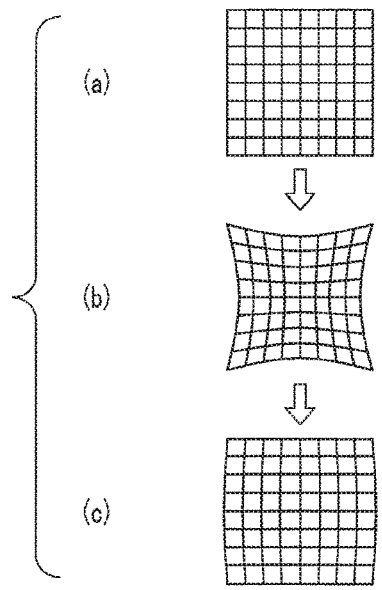
FIG. 2 is a diagram illustrating a distortion correction function achieved by a projection optical system.

FIG. 2 is a diagram illustrating a distortion correction function achieved by a projection optical system. The projection optical system pre-distorts an image to be displayed in the liquid crystal display element 5 based on image data as shown, for example, in FIG. 2(a) into a pincushion shape as shown in FIG. 2(b), so that the image can be projected on the inner surface 2a of the spherical screen 2 with a minimal distortion as shown in FIG. 2(c).

Figure 3:
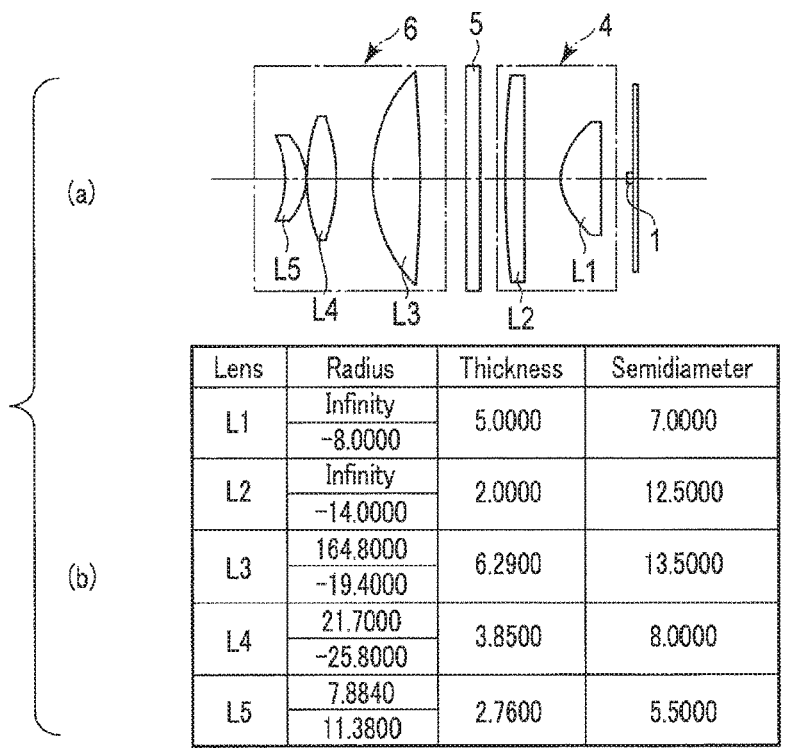
FIG. 3 is a diagram showing specific examples of first to fifth lenses.

FIG. 3(a) is a diagram showing specific examples of the aforementioned first lens L1 to the fifth lens L5. The first lens L1 is a planoconvex lens, and the second lens L2 is a Fresnel lens. The third lens L3 is an asymmetrical biconvex lens, the fourth lens is a symmetrical biconvex lens, and the fifth lens L4 is a meniscus lens having a convex surface adjacent to the fourth lens L4.

Figure 4:
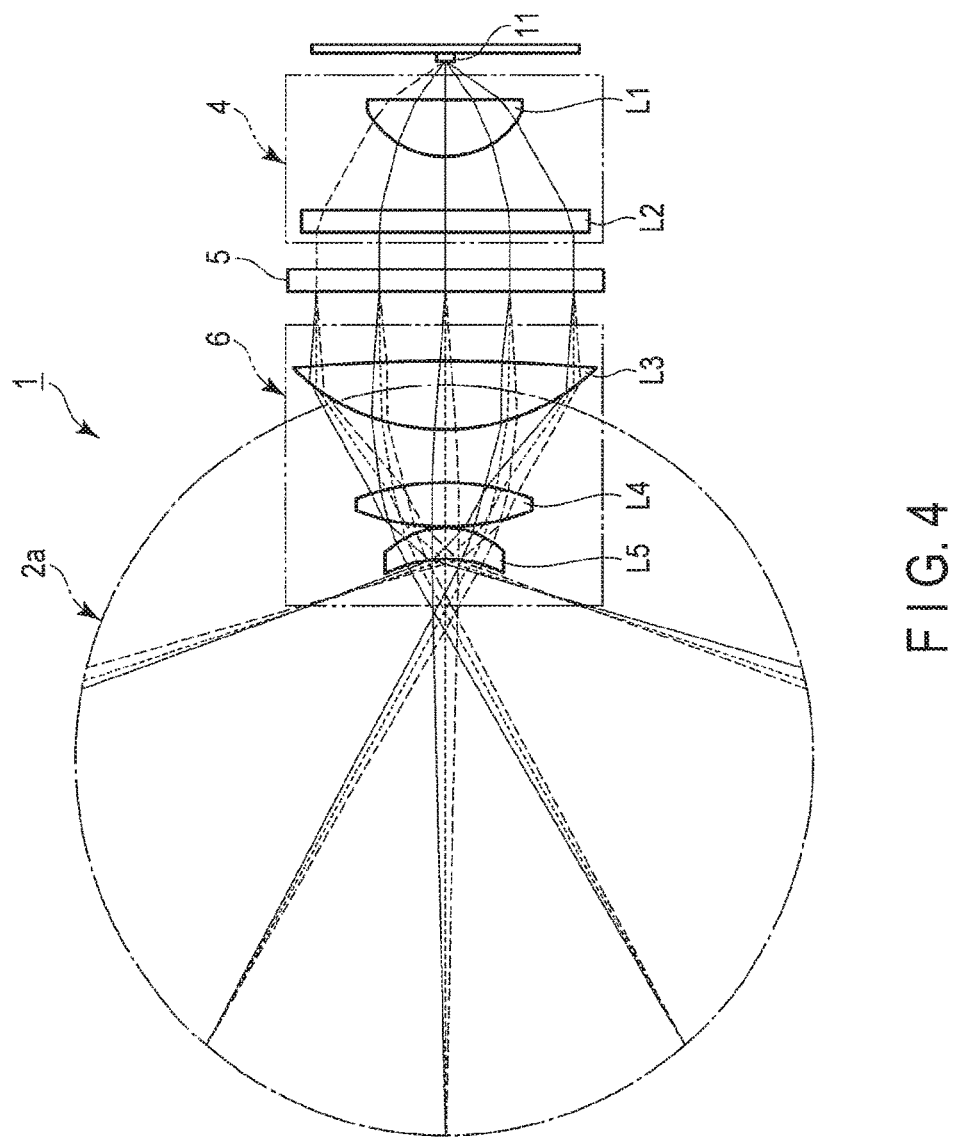
FIG. 4 is a diagram illustrating light tracks in an entire optical system of the spherical projection display apparatus.

FIG. 3(b) is a diagram illustrating the specifications of the first lens L1 to the fifth lens L5, including a curvature radius of both sides of a lens, a lens thickness, and a semidiameter of a lens. In FIG. 3(b), a value of each unit is millimeters, and the upper cell indicates a curvature radius of a surface of an incident light, and the lower cell indicates a curvature radius of a surface of an outgoing light. FIG. 4 is a diagram illustrating light tracks of all optical systems in the spherical projection display apparatus 1 in a case where the first lens L1 to the fifth lens L5 are of the specification indicated in FIG. 3(b).

In the sphere projection display apparatus 1 comprising the above-described structures, the projection optical system consisting of the third lens L3 to the fifth lens L5 has the distortion correction function to optically compensate distortion in an image projected on the inner surface 2a of the spherical screen 2; thus, it is possible to project a distortionless image without first correcting image data which expresses an image to be projected on the inner surface 2a of the spherical screen 2.

For this reason, even when a small spherical screen 2 is used and the spherical projection display apparatus 1 is incorporated into an arbitrary device having a function of outputting image data simply as a display device, it is not necessary to correct image data on the discretionary device side. Thus, the spherical projection display apparatus can achieve high versatility.

Moreover, in the spherical projection display apparatus 1 of the present embodiment, a projection region on which an image is projected in the spherical screen 2 is the region C (see FIG. 1) which is beyond the semi-sphere in the inner surface 2a of the spherical screen 2. For this reason, when a random image is displayed on the spherical screen 2, an observer positioned on the front side (shown as the left side in FIG. 1) where the projector unit 3 is not provided can observe the image over the surface of the spherical screen 2 even when the direction of view is more or less tilted with respect to the optical axis L of the projection optical system.

Accordingly, in the spherical projection display apparatus 1, a 2D image can of course be displayed three-dimensionally, and if a displayed image represents a random object, for example, the object can be displayed three-dimensionally with a more realistic feeling to the observer.

Figure 5:
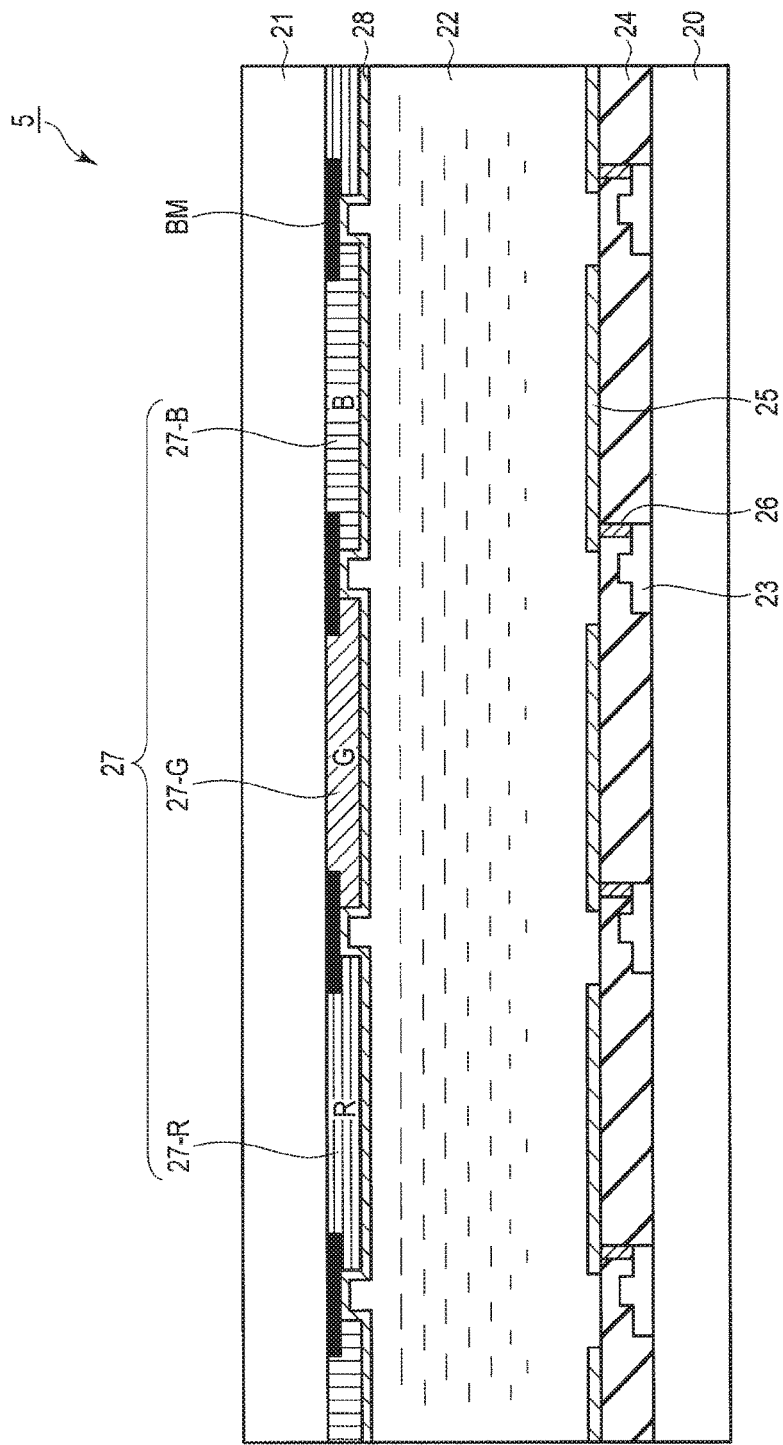
FIG. 5 is a cross-sectional diagram showing an example of a liquid crystal display element.

Next, a structure example of the liquid crystal display element 5 will be described. FIG. 5 is a cross-sectional diagram showing an example of a liquid crystal display element 5.

The liquid crystal display element 5 comprises a TFT substrate 20 on which a switching transistor and a pixel electrode, etc. are formed, a CT substrate 21 on which a color filter and a common electrode are formed and which is opposed to the TFT substrate 20, and a liquid crystal layer 22 which is sandwiched and held between the TFT substrate 20 and the CF substrate 21. Each of the TFT substrate 10 and the CF substrate 21 is made of a transparent substrate (e.g., a glass substrate). The TFT substrate 20 is arranged on the point light source 11 side, for example, and light from the point light source 11 is made incident to the liquid crystal display element 5 from the TFT substrate 20 side.

The liquid crystal layer 22 is made of liquid crystal materials sealed by a sealing material 29 that adheres the TFT substrate 20 with the CT substrate 21. The optical characteristics of the liquid crystal material are changed by operating the orientation of the liquid crystal molecules in accordance with an electric field applied between the TFT substrate 20 and the CF substrate 21. As a liquid crystal mode, a TN (Twisted Nematic) mode is used, for example; other liquid crystal modes, such as a VA (Vertical Alignment) mode, and a homogeneous mode may, of course, be adopted.

A plurality of switching transistors 23 are provided on the TFT substrate 20 on the liquid crystal layer 22 side. As the switching transistor 23, a thin film transistor (TFT) is used, for example. The switching transistor 23 comprises a gate electrode electrically coupled to a scanning line (not shown), a gate insulating film provided on the gate electrode, a semiconductor layer (e.g., amorphous silicon) provided on the gate insulating film, and a source electrode and a drain electrode provided separately on the semiconductor layer. The source electrode is electrically coupled to a signal line (not shown).

An insulating layer 24 is provided on the switching transistor 23. A plurality of subpixel electrodes 25 are provided on the insulating film 24. A contact plug 26 electrically coupled to the pixel electrode 25 is provided within the insulating layer 24 and on the drain electrode of the switching transistor 23.

A color filter 27 is provided on the CF substrate 21 on the liquid crystal layer 22 side. The color filter 27 comprises a plurality of colored filters (colored members); specifically, a plurality of red filters 27-R, a plurality of green filters 27-G, and a plurality of blue filters 27-B. A common color filter consists of the three primary colors of light; red (R), green (G), and blue (B). A set of three adjacent colors, R, G, and B, is a unit of display (the unit is called a pixel), and a single-color part in one pixel is called a subpixel and it is a minimum drive unit. The switching transistor 23 and the pixel electrode 25 are provided for each of the subpixels.

A black matrix BM for blocking light (a light shielding film) is provided on the boundary of the red filter 27-R, the green filter 27-G, and the blue filter 27-B. In other words, the black matrix BM is formed in a mesh pattern. The black matrix BM is provided to shield unnecessary light between the colored members and to improve contrast.

A common electrode 28 is provided on the color filter 27 and the black matrix BM. The common electrode 28 is formed over the entire display area of the liquid crystal display element 5.

A transparent electrode constitutes each of the pixel electrode 25, the contact plug 26, and the common electrode 28, and using, for example, ITO (indium-tin oxide). A transparent insulating material, such as silicon nitride (SiN), is used for the insulating films 24, for example.

As shown in FIG. 1, the incident side polarizing plate 30 and the emitting side polarizing plate 31 are provided so that the TFT substrate 20 and the CF substrate 21 are provided therebetween. In other words, the polarizing plate 30 is provided adjacently to the incident side of the TFT substrate 20, and the polarizing plate 31 is provided adjacently to the emitting side of the CF substrate 21. Each of the polarizing plates 30 and 31 have a transmission axis and an absorption axis mutually orthogonal on a plane orthogonal to the direction of light. Among lights having a plane of vibration in a random direction, linear polarization having a plane of vibration parallel to the transmission axis is transmitted, and linear polarization having a plane of vibration parallel to the absorption axis is absorbed by the polarizing plates 30 and 31. The polarizing plates 30 and 31 are arranged in such a manner that the transmission axes thereof are mutually orthogonal; in other words, they are arranged in the crossed-Nicols state.

Furthermore, a reflective polarizing plate (reflection type polarizing plate) 32 is provided on the incident side of the polarizing plate 30, separately from the polarizing plate 30. The reflective polarizing plate 32 has a transmission axis and a reflection axis mutually orthogonal within a plane orthogonal to a direction of light. Among lights having a plane of vibration in a random direction, linear polarization having a plane of vibration parallel to the transmission axis is transmitted, and linear polarization having a plane of vibration parallel to the reflection axis is reflected by the polarizing plate 32. The transmission axis of the reflective polarizing plate 32 is set parallel to the transmission axis of the polarizing plate 30. As the reflective polarizing plate 32, DBEF (Dual Brightness Enhancement Film) manufactured by 3M Company, or a wire grid polarizing plate manufactured by Asahi Kasei Corp., for example, is available. The plane view of the polarizing plates and the reflective polarizing plate in FIG. 1 is viewed from the point light source 11.

If there is no reflective polarizing plate, a light component in the direction of the absorption axis of the incident side polarizing plate is absorbed by the incident side polarizing plate. As a result, the incident side polarizing plate generates heat, and the heat is conducted to the liquid crystal layer, causing deterioration of the characteristics (contrast, etc.) of the liquid crystal layer.

In contrast, in the present embodiment, the reflective polarizing plate 32 is provided on the incident side polarizing plate 30 on the point light source side 11, and the reflection axis of the reflective polarizing plate 32 is set in parallel to the absorption axis of the incident side polarizing plate 30. The reflective polarizing plate 32 reflects a light component in the absorption axis direction of the incident side polarizing plate 30; thus, the light that is transmitted through the reflective polarizing plate 32 contains almost no light components in the absorption axis direction of the incident side polarizing plate 30. Thus, light components absorbed by the incident side polarizing plate 30 are reduced; consequently, the generation of heat in the incident side polarizing plate 30 can be suppressed.

[Variation 1]

Figure 6:
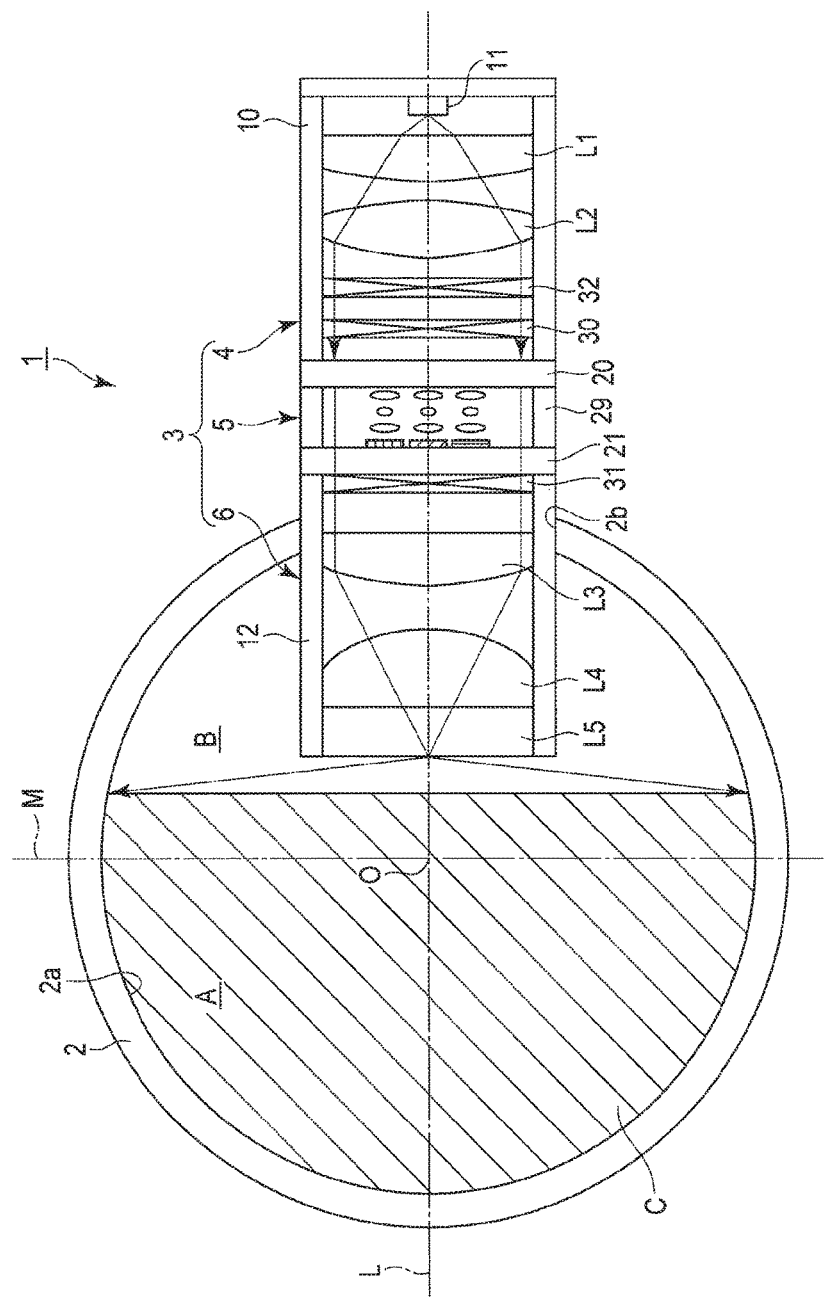
FIG. 6 is a diagram schematically showing a cross-sectional structure of the spherical projection display apparatus according to variation 1.

Next, variation 1 of the first embodiment will be described. FIG. 6 is a diagram schematically showing a cross-sectional structure of the spherical projection display apparatus according to variation 1.

The incident side polarizing plate 30 is arranged separately from the TFT substrate 20. Thus, it is possible to prevent heat generated at the incident side polarizing plate 30 from being conducted to the liquid crystal layer 22. As a result, it is possible to prevent a temperature rise in the liquid crystal layer 22.

[Variation 2]

Next, variation 2 of the first embodiment will be described. FIG. 7 is a diagram schematically showing a cross-sectional structure of the spherical projection display apparatus according to variation 2.

The emitting side polarizing plate 30 is arranged separately from the CF substrate 21. Thus, it is possible to prevent heat generated at the emitting side polarizing plate 31 from being conducted to the liquid crystal layer 22. As a result, it is possible to prevent a temperature rise in the liquid crystal layer 22.

[Effects]

As described in detail above, the display apparatus according to the first embodiment comprises the liquid crystal display element 5 which transmits light from the point light source 11, and the spherical screen 2 which receives projection light from the liquid crystal display element 5. The incident side polarizing plate 30 is provided between the point light source 11 and the liquid crystal display element 5, and the emitting side polarizing plate 31 is provided between the liquid crystal display element 5 and the spherical screen 2, and the reflective polarizing plate 32, which reflects components parallel to the reflection axis among light of the point light source 11, is provided between the point light source 11 and the incident side polarizing plate 30. Furthermore, the reflection axis of the reflective polarizing plate 32 is set parallel to the absorption axis of the incident side polarizing plate 30.

Accordingly, according to the first embodiment, the reflective polarizing plate 32 reflects a light component in the direction of the absorption axis of the incident side polarizing plate 30; consequently, alight transmitted through the reflective polarizing plate 32 contains almost no light components in the direction of the absorption axis of the incident side polarizing plate 30. Thus, light components absorbed by the incident side polarizing plate 30 are reduced; consequently, the generation of heat in the incident side polarizing plate 30 can be suppressed. Since a temperature rise in the liquid crystal display element 5, particularly in the liquid crystal layer 22, can be suppressed, the deterioration of the display characteristics of the liquid crystal display element 5, particularly a decrease in contrast, can be suppressed.

Figure 8:
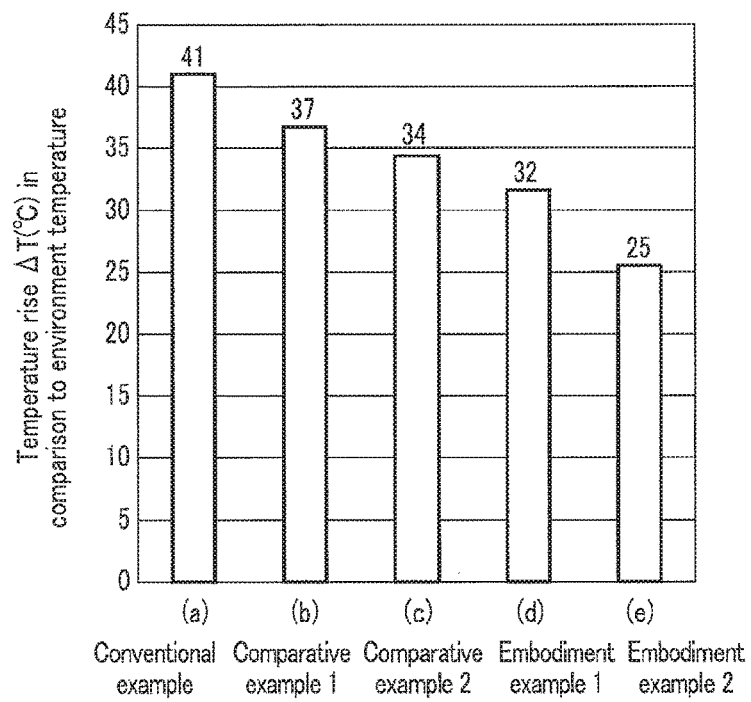
FIG. 8 is a graph showing an example of a temperature rise in a liquid crystal display element in comparison to an environmental temperature.

FIG. 8 is a graph showing an example of a temperature rise in a liquid crystal display element (LCD) in comparison to an environmental temperature. The vertical axis of the graph in FIG. 8 indicates a temperature rise $\Delta T$ (° C.) compared to an environmental temperature.

Figure 9:
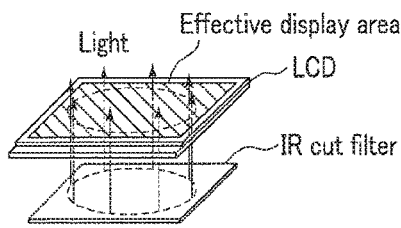
FIG. 9 is a schematic diagram of the liquid crystal display element according to the comparative example 1.
Figure 10:
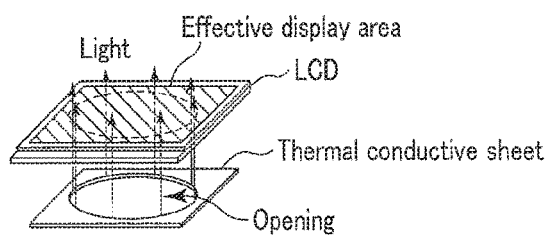
FIG. 10 is a schematic diagram of the liquid crystal display element according to the comparative example 2.

FIG. 8(a) is a graph related to a conventional example in which no countermeasures are taken for heat generated in the LCD. FIG. 8(b) is a graph related to a comparative example in which an IR (infrared) cut filter is inserted between an LCD and a light source, as shown in FIG. 9. FIG. 8(c) is a graph related to a comparative example in which a thermal conductive sheet (thermal diffusion sheet) is inserted in an LCD, as shown in FIG. 10. The thermal conductive sheet is formed so as to have an opening for passing through light from the light source optical system, and is arranged adjacently to the polarizing plate included in the LCD, for example.

FIG. 8(d) is a graph related to an embodiment example in which the reflective polarizing plate is inserted between the incident side polarizing plate and the light source (i.e., corresponding to the configuration shown in FIG. 1 of the present embodiment). FIG. 8(e) is a graph related to an embodiment in which the reflective polarizing plate is inserted between the incident side polarizing plate and the light source, and the incident side polarizing plate is separated from the substrate (i.e., corresponding to the configuration shown in FIG. 6 of the present embodiment).

Compared to the conventional example shown in FIG. 8(a), the comparative example shown in FIG. 8(b), and the comparative example shown in FIG. 8(c), the temperature rise $\Delta T$ can be suppressed in the embodiment example 1 shown in FIG. 8(d) and in the embodiment example 2 shown in FIG. 8(e). Particularly, the effect of suppressing the temperature rise $\Delta T$ is significant in the embodiment example 2 shown in FIG. 8(e).

Second Embodiment

FIG. 11 is a diagram schematically showing a cross-sectional structure of the spherical projection display apparatus 1 according to the second embodiment of the present invention.

The spherical projection display apparatus 1 further comprises the IR (infrared) cut filter 33 supported by the case 10 and provided between the polarizing plate 30 and the reflective polarizing plate 32. The configuration is the same as that of the first embodiment except for the IR cut filter 33. The IR cut filter 33 cuts IR light made incident from the point light source 11 side. In other words, the IR cut filter 33 has a function of suppressing IR light made incident on the liquid crystal display element 5, which is a main source of heat in the point light source 11.

As shown in FIG. 11, the IR cut filter 33 is arranged between the polarizing plate 30 and the reflective polarizing plate 32. However, the configuration is not limited thereto; the IR cut filter 33 may be arranged between the second lens L2 and the reflective polarizing plate 32. The IR cut filter 33 may be arranged between the point light source 11 and the first lens L1.

Figure 12:
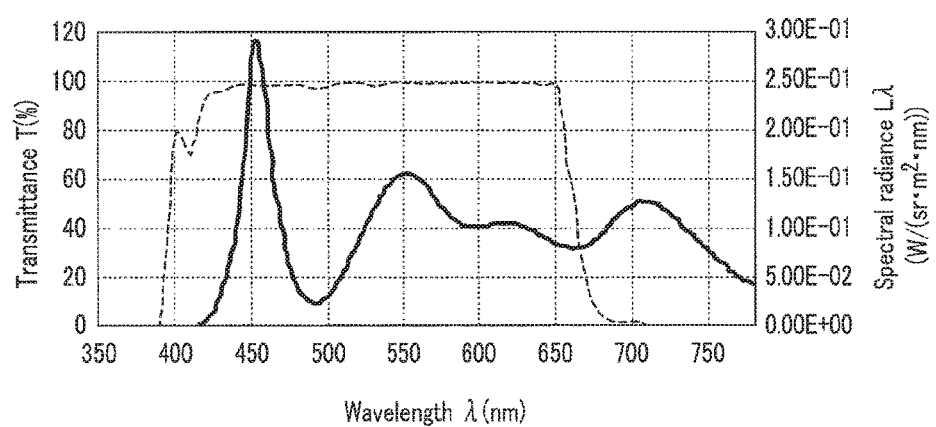
FIG. 12 is a graph illustrating a transmission rate of the IR cut filter and a spectral radiance of a point light source.

FIG. 12 is a graph illustrating a transmission rate of the IR cut filter and a spectral radiance of a point light source. The broken line in FIG. 12 indicates the transmittance T (%) of the IR cut filter 33, and the solid line in FIG. 12 indicates the spectral radiance $L\lambda$ (W/(sr·m²·nm)) of the point light source 11. The horizontal axis in FIG. 12 indicates a wavelength $\lambda$ (nm).

For example, the IR cut filter 33 cuts light having the wavelength $\lambda$ greater than 700 nm (electromagnetic wave). Thus, light of a wavelength of 700 nm or greater which is made incident onto the liquid crystal display element 5 can be prevented; consequently, the generation of heat in the liquid crystal display element 5 due to the infrared radiation from the point light source 11 can be suppressed. As a result, it is possible to suppress a temperature rise in the liquid crystal layer 22.

Third Embodiment

Figure 13:
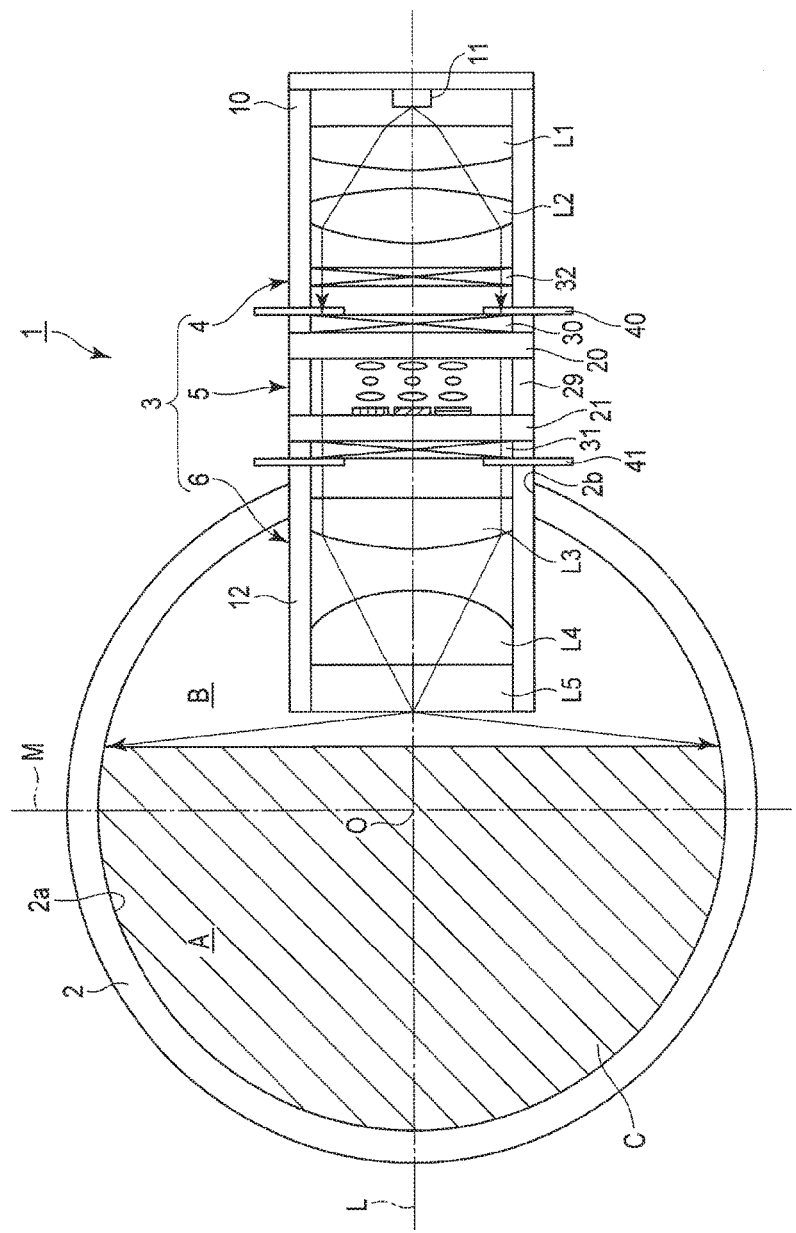
FIG. 13 is a diagram schematically showing a cross-sectional structure of the spherical projection display apparatus according to the third embodiment of the present invention.

FIG. 13 is a diagram schematically showing a cross-sectional structure of the spherical projection display apparatus 1 according to the third embodiment of the present invention.

Figure 14:
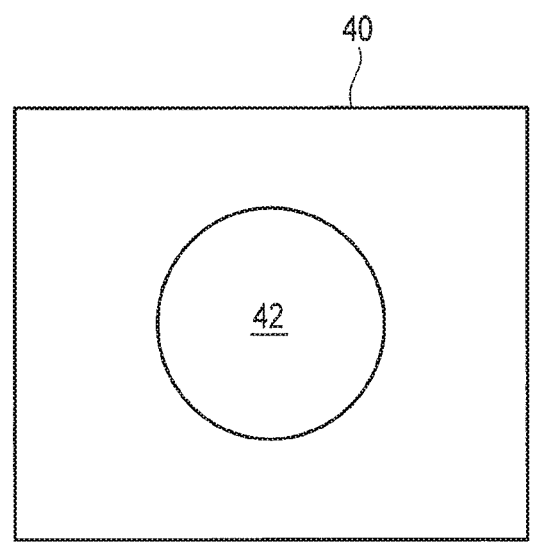
FIG. 14 is a plane view of a thermal conductive sheet.

The thermal conductive sheet (thermal diffusion sheet) 40 is provided adjacently on the incident side polarizing plate 30 on the side opposite of the side where the TFT substrate 20 is adjacent to the incident side polarizing plate 30. The thermal conductive sheet (thermal diffusion sheet) 41 is provided adjacently on the incident side polarizing plate 31 on the side opposite of the side where the TFT substrate 21 is adjacent to the incident side polarizing plate 31. FIG. 14 is a plane view of the thermal conductive sheet 40. The configuration of the thermal conductive sheet 41 is the same as that of the thermal conductive sheet 40. The thermal conductive sheet 40 has a circular opening 42 for transmitting light necessary for image display. The shape of the opening 42 may be other than a circle, unless the size of the opening does not block the projection light from the liquid crystal display element 5. A graphite sheet, a metal plate with a high conductivity (e.g., copper, aluminum), and a laminated film of a graphite sheet and a metal plate may be used for the thermal conductive sheets (thermal conductive plates) 40 and 41. The thermal conductive sheets 40 and 41 are respectively adhered to, for example, the TFT substrate 20 and the CT substrate 21.

A part of the thermal conductive sheet 40 is formed in such a manner that the part is projected to the outside of the case 10. Similarly, a part of the thermal conductive sheet 41 is formed in such a manner that the part is projected to the outside of the case 12. The larger the surface area of the sheet is, the more the thermal dissipation of the heat conductive sheet 40 improves; accordingly, it is desirable if the cross section of the part projecting to the outside of the case 10 is wave-shaped. Similarly, it is desirable if the cross section of the part of the thermal conductive sheet 41 projecting to the outside of the case 12 is wave-shaped.

According to the third embodiment, the heat generated at the polarizing plates 30 and 31 are conducted to the thermal conductive sheets 40 and 41, and dissipated outside the spherical projection display apparatus 1. Thus, it is possible to prevent a temperature rise in the liquid crystal display element 5.

The number of thermal conductive sheets is not necessarily two; only one of either the thermal conductive sheets 40 and 41 may be used. It is possible to use the thermal conductive sheet according to the third embodiment in the variations of the first embodiment or the second embodiment.

There is no particular limit as to into which device the spherical projection display apparatus 1 explained in the first to third embodiments may be incorporated; if it is incorporated into an amusement apparatus (game apparatus), such as a pachinko game machine, etc., the entertainment aspect of the amusement apparatus can be enhanced. The spherical projection display apparatus 1 is suitable for displaying a spherical figure (e.g., a globe) on the spherical screen 2.

In the first to third embodiments, the screen on which the projection light of the liquid crystal display element 5 is emitted is not limited to a spherical screen; it may be a plane screen.

The present invention is not limited to the embodiments described above, and can be embodied by modifying constituent elements without departing from the gist of the invention. In addition, the above embodiments include inventions of various stages, and various inventions can be formed by proper combinations of a plurality of constituent elements disclosed in one embodiment or proper combinations of constituent elements disclosed in different embodiments. When, for example, the problems to be solved by the present invention can be solved and the effects of the invention can be obtained even if several constituent elements are omitted from all the constituent elements disclosed in each embodiment, an embodiment from which these constituent elements are omitted can be extracted as an invention.

What is claimed is:

1. A display apparatus comprising:
   a light source;
   a liquid crystal display element which transmits light from the light source;
   a screen which receives projection light from the liquid crystal display element, and is spherical in shape and transmissive:
   a first polarizing plate which is provided between the light source and the liquid crystal display element, and in contact with the liquid crystal display element;
   a second polarizing plate which is provided between the liquid crystal display element and the screen, and in contact with the liquid crystal display element;
   a reflective polarizing plate which is provided between the light source and the first polarizing plate, and reflects a light component parallel to a reflection axis among the light from the light source; and
   a first thermal conductive sheet which is provided between the reflective polarizing plate and the first polarizing plate, and in contact with the first polarizing plate, the first thermal conductive sheet comprising a circular opening so that the first thermal conductive sheet, except for the circular opening, blocks light passing through the reflective polarizing plate.

2. The display apparatus according to claim 1, wherein at least one of the first polarizing plate and the second polarizing plate is arranged separately from the liquid crystal display element.

3. The display apparatus according to claim 1, further comprising an infrared cut filter provided between the light source and the liquid crystal display element.

4. The display apparatus according to claim 1, further comprising a second thermal conductive sheet which is provided between the second polarizing plate and the screen, and in contact with the second polarizing plate, the second thermal conductive sheet comprising a circular opening for permitting the projection light from the liquid crystal display element to pass through.

5. The display apparatus according to claim 1, further comprising a second lens which is provided between the second polarizing plate and the screen, and spreads light from the second polarizing plate.

6. The display apparatus according to claim 1, further comprising:
   a first case which supports the light source, the reflective polarizing plate and the first polarizing plate; and
   a second case which supports the second polarizing plate and the screen.

7. The display apparatus according to claim 6, wherein the second case is inserted into the screen.

8. The display apparatus according to claim 1, wherein the light source comprises a point light source.

9. The display apparatus according to claim 1, wherein the reflection axis of the reflective polarizing plate is parallel to an absorption axis of the first polarizing plate.

10. The display apparatus according to claim 1, wherein the first thermal conductive sheet includes graphite, copper or aluminum.

11. The display apparatus according to claim 4, wherein the second thermal conductive sheet includes graphite, copper or aluminum.

12. The display apparatus according to claim 1, further comprising a first lens which is provided between the light source and the reflective polarizing plate, and changes the light from the light source to parallel light.

13. The display apparatus according to claim 5, wherein the second lens projects the projection light on a region larger than a hemisphere region of the screen.

* * * * *